United States Patent [19]
Yellin

[11] 3,992,811
[45] Nov. 23, 1976

[54] SAND PAINTING UNIT

[76] Inventor: Bernard Yellin, 5252 S. Kolmar Ave., Chicago, Ill. 60632

[22] Filed: Mar. 10, 1975

[21] Appl. No.: 556,678

[52] U.S. Cl. .................................. 47/69; D7/27; 220/23.83; 220/17; 220/22
[51] Int. Cl.² ........................................ A01G 9/02
[58] Field of Search .................................. 47/1–2, 47/34, 38, 38.1, 41–41.13; 119/5; 220/17–18, 20, 22, 23.83, 83 R, 23.6; D35/3; D30/6–12; D7/27; D9/18; 248/349

[56] References Cited
UNITED STATES PATENTS

| 117,965 | 8/1971 | Barrie | 220/23.83 X |
| 296,853 | 4/1884 | Ledig | 119/5 |
| 776,363 | 11/1904 | Snyder | D7/27 X |
| 1,263,391 | 4/1918 | Eickemeyer | 119/5 |
| 1,838,215 | 12/1931 | De Clairmont | 119/5 |
| 1,991,683 | 2/1935 | Kelly | 119/5 |
| 2,198,459 | 4/1940 | Potts | 220/22 X |
| 2,352,684 | 7/1944 | Braddock | 220/23.6 |
| 2,465,684 | 3/1949 | Heintze | 47/41.13 X |
| 2,719,413 | 10/1955 | Panzer | 248/349 X |
| 3,283,743 | 11/1966 | Dibelius | 119/5 X |
| 3,391,816 | 7/1968 | Swett | 220/22 |
| D167,243 | 7/1952 | Yellin | D35/3 A |
| D221,177 | 7/1971 | Wong | D7/27 |

FOREIGN PATENTS OR APPLICATIONS 966,743  10/1950  France ............................. 47/41

Primary Examiner—Robert E. Bagwill
Attorney, Agent, or Firm—Max R. Kraus

[57] ABSTRACT

A sand painting unit comprising an outer member formed of a material having a transparent or viewing surface, an inner member spaced from the outer member and defining a reduced width area therebetween, with the reduced width area forming a container adapted to receive grains or particles of sand, some of the grains or particles of sand having natural color and some in various colors so that the grains or particles of sand may be blended, interspersed and/or mixed to form pictures and/or designs which may be viewed through the transparent surface and which provides a three-dimensional effect to the pictures or designs.

9 Claims, 6 Drawing Figures

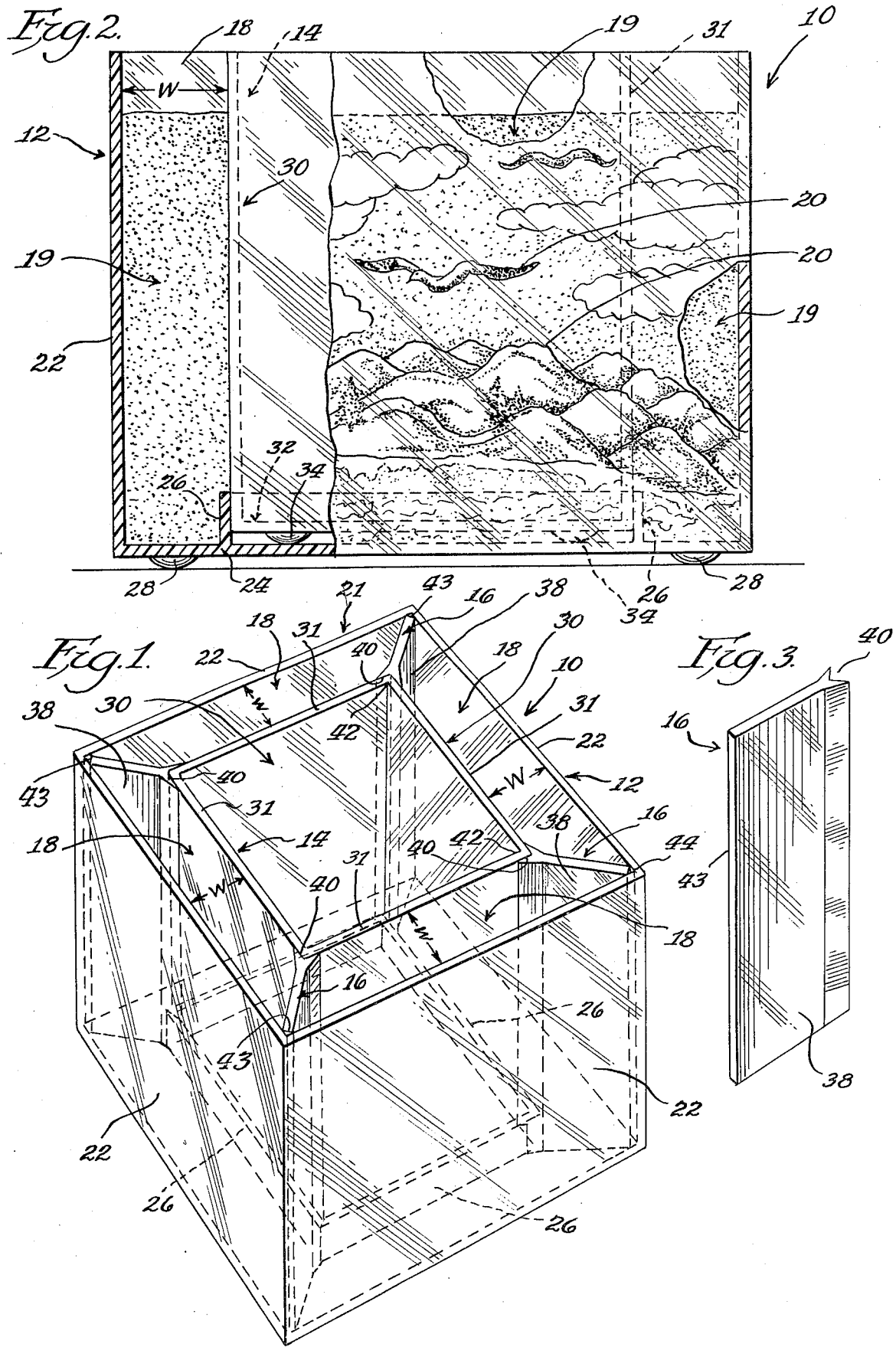

SAND PAINTING UNIT

BRIEF SUMMARY OF THE INVENTION

This invention is directed to sand painting and one of the objects of the invention is to provide a unit having a reduced width area between the outer and inner walls, with a transparent or viewing outer wall, which unit is to receive grains or particles of sand, some of which is in natural color and some of which is in various colors, which is blended, interspersed and/or mixed to form a sand painting or sand design which when viewed through the transparent or viewing outer wall provides a picture or design having a three-dimensional effect.

Another object of this invention is to provide a sand painting unit which consists of an outer transparent wall and an inner wall spaced from each other to provide a reduced width area between said walls which is adapted to receive the natural and colored grains or particles of sand which are blended, interspersed and/or intermixed in such a manner as to form a sand painting or sand design.

Another object of this invention is to provide a unit of the foregoing character having an outer member and an inner member which is received within the outer member but is spaced therefrom to define a reduced width area between said members to provide a pocket or pockets for receiving the grains or particles of sand which are arranged to form a picture or design.

Another object of this invention is to provide a sand painting unit for the foregoing purpose which is formed of an outer boxlike structure and an inner box-like structure positioned within the outer box-like structure with removable partitions therebetween so that there is formed a plurality of sides having space areas of reduced width between the inner and outer box-like members so that each reduced width space area may receive the grains or particles of sand which can be arranged to form a painting or design having a three-dimensional effect.

Another object of this invention is to provide outer and inner bowl-shaped members with the inner bowl positioned within the outer bowl to define a space area of a reduced width therebetween for receiving the sand in the formation of a sand painting or sand design.

Another object of this invention is to provide a structure of the foregoing character in which the inner box-like member or inner bowl may be used as a receptacle for receiving earth and the like and may be used for a planter for plants.

BRIEF DESCRIPTION OF THE DRAWINGS

In the drawings:

FIG. 1 is a perspective view of the assembled unit before filling same with the sand particles.

FIG. 2 is a view partly in cross-section of the unit shown in FIG. 1 and showing the reduced areas filled with the natural and colored particles of sand to form any desired sand picture or design which is viewed from the transparent exterior.

FIG. 3 is a perspective view of the removable corner partition or wall used in the assembly of FIGS. 1 and 2.

FIGS. 1, 2 AND 3

Figure 4:
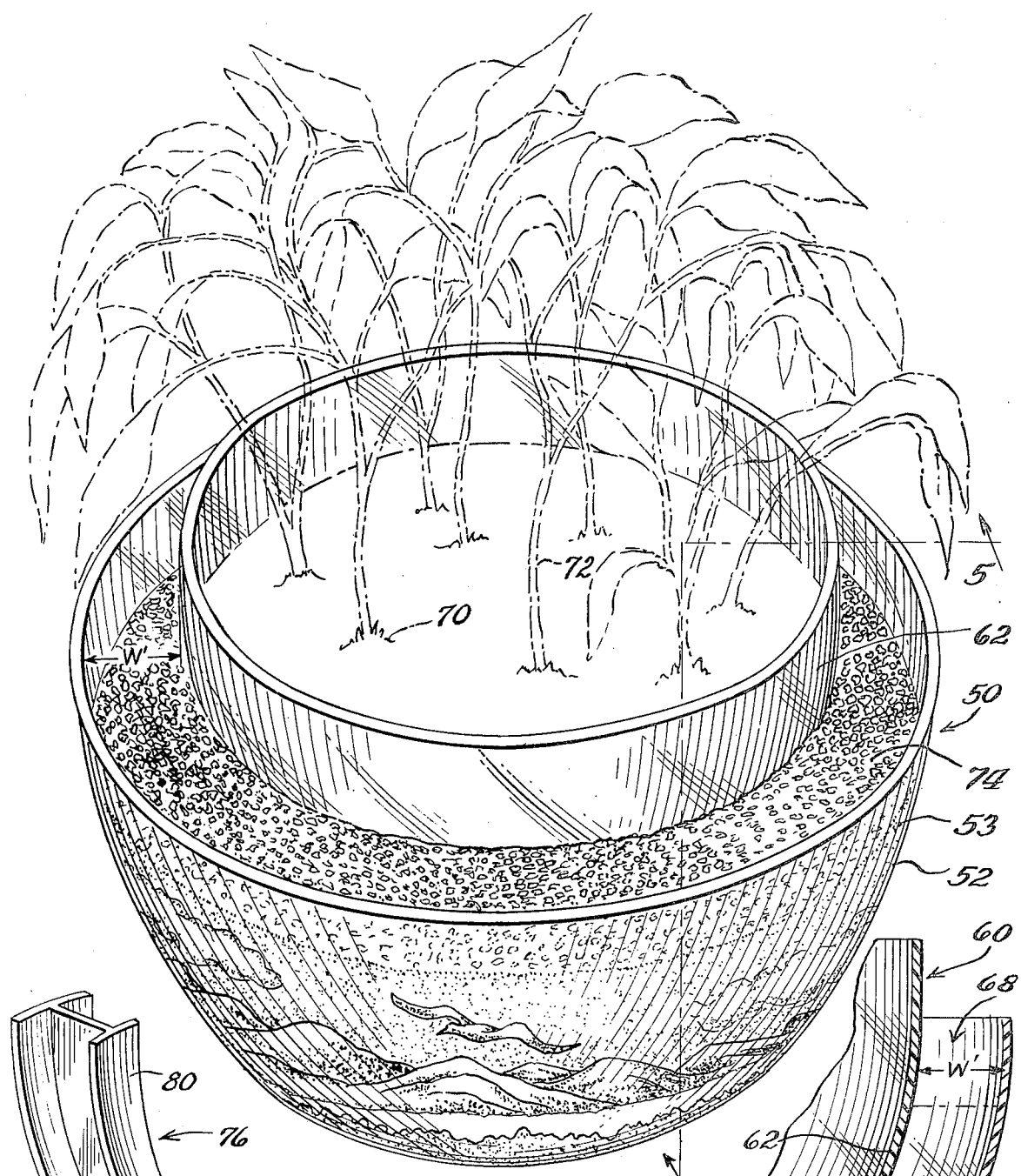
FIG. 4 is a view of a modified unit in which the reduced sand container area is continuous and is of annular shape and is formed by an outer bowl and an inner bowl, one positioned within the other.

The structure shown in FIGS. 1, 2 and 3 will be first described. The sand painting unit is generally designated at 10 and comprises an outer member generally indicated at 12, formed of transparent material, and an inner member generally indicated at 14 which is of smaller dimension than the outer member and is adapted to fit therewithin and is spaced therefrom, and removable corner partitions generally indicated at 16 which provide four areas of reduced width between their respective outer and inner walls, each forming a container or pocket generally indicated at 18 to receive grains or particles of sand 19 in natural and various colors which are blended, interspersed and/or mixed to form a desired sand picture or sand design as indicated at 20 which may be viewed exteriorly of the outer member 12. Each of the containers or pockets 18 may be used to form a different sand picture.

More specifically, the outer member 10 is integrally molded of a transparent or see-through plastic material to form a box-like structure generally indicated at 21 having four transparent side walls 22, with the adjacent side walls preferably at right angles to each other. The outer box-like member 21 has a bottom 24 provided with a continuous upstanding lip or flange 26 spaced inwardly of the side walls 22 but each parallel to its respective side wall, which continuous lip or flange is adapted to receive the bottom of the inner member and retain it in spaced relation to the outer member. Extending downwardly from the bottom 24 are knob-like members 28 on which the unit rests on a supporting surface, such as a table or the like.

The inner member 14 is also a box-like structure generally indicated at 30 and is integrally molded of a plastic material and has four side walls each generally designated at 31, with adjacent walls preferably at right angles to each other. The box-like member 30 has a bottom 32. Extending downwardly from the bottom are knoblike members 34 which rest on the bottom 24 of the outer member 12 when the inner unit is positioned in the outer member, as best seen in FIG. 2. The upstanding continuous flange or lip 26 in the outer unit positions and centers the inner unit 14 with respect to the outer unit 12 to provide sand receiving spaces, containers or pockets 18 which are open at the top.

To divide the otherwise continuous sand receiving space into four separate spaces, containers or pockets there is provided four removable partitions of identical construction, each generally indicated at 16 and each comprising a flat wall 38 having its inner edge formed to provide a V-shaped edge 40. One partition 16 is inserted at each of the corners between the inner and outer members, with the V-shaped edge 40 engaging the corner 42 of the inner member 14 and with the outer edge 43 of the partition positioned against a corner 44 of the outer member 12. The four sand receiving spaces thus formed, best shown in FIG. 1, have a reduced width generally indicated at W between the adjacent parallel sides of the outer and inner box-like members and each is adapted to receive the natural and colored particles of sand which is arranged to form a different sand picture or sand design. One of such sand pictures formed is shown in FIG. 2 for illustrative purpose and is designated generally at 20. The sand picture or sand design thus formed is dependent on the skill of the person in blending, interspersing and/or mixing the various colored sand particles with the natural colored sand particles.

The inner member 14 may serve as a receptacle or container for any desired purpose and may also serve as a planter such as more fully described in connection with the embodiment shown in FIGS. 4 and 5.

FIGS. 4, 5 AND 6

Figure 6:
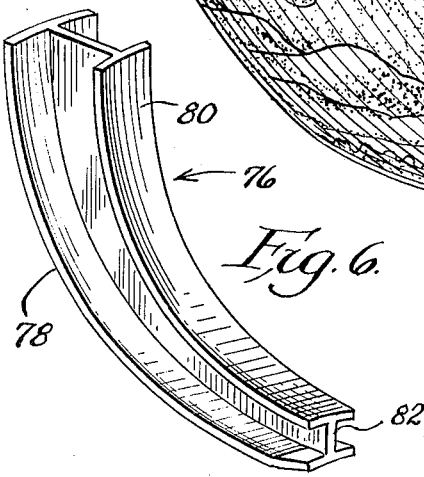
FIG. 6 is a view of a removable partition that may be used with the modified unit.
Figure 5:
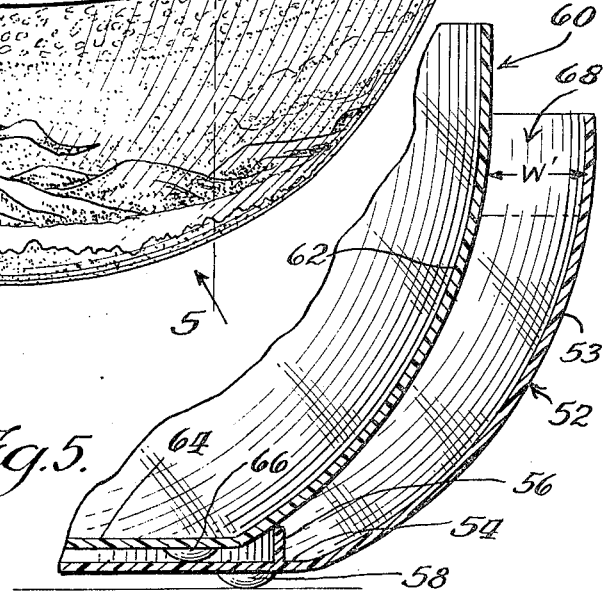
FIG. 5 is a cross-sectional view taken on line 5—5 of FIG. 4, but without the sand grains or particles.

FIGS. 4, 5 and 6 show a modification in which the sand painting unit generally indicated at 50 comprises an annular-shaped outer bowl generally indicated at 52 integrally formed of a transparent plastic material having a curvilinear side 53 which merges into a flat bottom 54. The flat bottom 54 has an annular upstanding lip or flange 56, best shown in FIG. 5. Extending downwardly from the bottom 54 are knob-like members 58 on which the outer bowl rests. Positioned inside the outer bowl is an inner bowl generally indicated at 60 having a curvilinear side 62 conforming generally to the curvilinear side 53 and shape of the outer bowl. The curvilinear side 62 merges into a horizontal flat bottom 64 provided with downwardly extending knobs 66. The annular curvilinear side wall 62 of the inner bowl extends upwardly of the annular wall 53 of the outer bowl.

The inner bowl 60 is integrally formed of a plastic material and may also be transparent if so desired. The inner bowl is positioned within the outer bowl 52 and the annular upstanding lip 56 centers the inner bowl with respect to the outer bowl to define an annular space or pocket generally indicated at 68 having a reduced width W' between the outer and inner walls 53 and 62 which is adapted to receive the grains or particles of sand for the purpose of forming a sand painting such as illustrated in FIG. 4 and indicated by the numeral 68. The space or pocket 66 shown in this embodiment is continuous so that a continuous sand picture may be formed extending around the entire annular surface which would be visible from the exterior of the outer bowl. The inner bowl 60 is hollow and may be filled with earth 70, with plants or flowers 72 planted therein, or it may be used to receive any other articles it is desired to place therewithin. The top of the particles of sand may be covered with a layer of colored pebbles indicated at 74 for decorative purpose.

Instead of providing a continuous annular space or pocket 66, the said space may be divided into a plurality of segments by positioning removable partitions at spaced distances between the outer and inner walls 53 and 62 so that a plurality of spaces or pockets 66 may be formed, in much the same manner that the four spaces or pockets like 18 are formed in the unit shown in FIGS. 1 and 2. As best shown in FIG. 6, the removable partitions generally indicated at 76 in side elevation conform to the curvature of the outer and inner sides 53 and 62, with the outer and inner edges of the partition having transversely extending curvilinear walls 78 and 80 respectively, which abut respectively against the outer and inner sides 53 and 62 and are wedged therebetween to divide the annular space into sections. The bottom has a vertical edge 82 which abuts against the lip or flange 56.

With respect to both embodiments and dependent upon the particular skill of the person, attractive pictures and/or designs may be formed by the arrangement of the colored sand in relation to the natural colored sand. The sand particles will remain in the arranged picture form until such time as it is desired to form a different sand picture or painting, which may be readily done by removing the sand from the reduced spaces and in effect repainting it with another picture formation.

The term "reduced width", indicated at W in FIGS. 1 and 2 and at W' in FIGS. 4 and 5 is intended to distinguish such reduced width from the overall width of each of the entire units. By providing a unit in which the width area between the outer and inner walls is reduced in both embodiments, various sand pictures and sand designs may be formed to provide a three-dimensional visual effect by the use of a minimum amount of grains or particles of sand, thus reducing the volume of such sand particles which might otherwise be necessary if the overall width of the unit were filled with sand particles. Also, a person can change one of the sand pictures without affecting the others, particularly where the partitions are used.

What is claimed is:

1. A sand painting unit comprising an outer container member having a continuous transparent upstanding wall and a bottom horizontal wall connected to said upstanding wall, an inner container having a continuous upstanding wall and a bottom horizontal wall connected to said last mentioned upstanding wall, said bottom wall of said outer container having means for receiving and positioning the inner container relative to said outer container so that the upstanding wall of said inner container is spaced from the upstanding wall of said outer container to define a reduced width area between said upstanding walls, said reduced width area being closed at the bottom and open at the top, said reduced width area forming a container means receiving and retaining grains of sand, some of which are in various colors so that when said grains of sand are blended, interspersed and/or mixed, pictures or designs may be formed therefrom and viewed through said upstanding walls of said outer container member.

2. A sand painting unit as set forth in claim 1 in which the outer container member has a plurality of transparent upstanding walls and in which the inner container has a corresponding plurality of upstanding walls, with said corresponding inner upstanding walls parallel to said outer upstanding walls and spaced therefrom, and with said corresponding upstanding walls of said outer and inner containers providing the reduced width areas.

3. A sand painting unit as set forth in claim 1 in which the outer container member is a box-shaped unit having a plurality of transparent sides forming the continuous transparent upstanding wall and the inner container is a box-shaped unit of smaller dimensions having a corresponding plurality of sides forming the continuous upstanding wall, each pair of outer and inner sides being parallel and defining a reduced width area therebetween, with each of said reduced width areas forming a container for the purpose as set forth.

4. A sand painting unit as set forth in claim 3 in which partition members extend between the corners between the outer and inner box-like units to form a confined reduced width area between each pair of outer and inner sides.

5. A sand painting unit as set forth in claim 4 in which the partitions are removable and have a notch at one end to engage the corner of the inner box-shaped unit.

6. A sand painting unit as set forth in claim 3 in which the bottom of the outer box-shaped unit has upstanding lips to receive the bottom of the inner box-shaped unit and space it from the outer box-shaped unit, and in which the inner box-shaped unit forms a container for plants and the like.

7. A sand painting unit as set forth in claim 1 in which the outer container member and the inner container are each of annular shape, with the inner container which is of a smaller dimension than the outer member being positioned within the outer container member to form a continuous annular reduced width area therebetween.

8. A sand painting unit as set forth in claim 7 in which the inner container serves as a container for plants and the like.

9. A sand painting unit as set forth in claim 8 in which partitions extend between the outer and inner containers to form a plurality of reduced width areas.

* * * * *